US008839585B2

(12) United States Patent
Santiago Prowald et al.

(10) Patent No.: US 8,839,585 B2
(45) Date of Patent: Sep. 23, 2014

(54) LOW WEIGHT, COMPACTLY DEPLOYABLE SUPPORT STRUCTURE

(75) Inventors: Julian B. Santiago Prowald, Wassenaar (NL); Miguel Such Taboada, Malaga (ES)

(73) Assignee: European Space Agency, Paris Cedex (FR)

( * ) Notice: Subject to any disclaimer, the term of this patent is extended or adjusted under 35 U.S.C. 154(b) by 0 days.

(21) Appl. No.: 13/988,508

(22) PCT Filed: Nov. 19, 2010

(86) PCT No.: PCT/EP2010/007044
§ 371 (c)(1),
(2), (4) Date: Sep. 11, 2013

(87) PCT Pub. No.: WO2012/065619
PCT Pub. Date: May 24, 2012

(65) Prior Publication Data
US 2013/0340373 A1    Dec. 26, 2013

(51) Int. Cl.
*E04B 1/34* (2006.01)
*H01Q 15/20* (2006.01)
*H01Q 15/16* (2006.01)
*B64G 1/22* (2006.01)
*E04B 1/344* (2006.01)
*B64G 1/66* (2006.01)
*H01Q 1/28* (2006.01)

(52) U.S. Cl.
CPC ............... *B64G 1/66* (2013.01); *H01Q 15/20* (2013.01); *H01Q 15/161* (2013.01); *B64G 1/222* (2013.01); *E04B 1/3441* (2013.01); *H01Q 1/288* (2013.01)
USPC ............ 52/646; 52/81.3; 52/653.2; 52/655.1; 52/656.9

(58) Field of Classification Search
CPC .......... E04B 1/3211; E04B 2001/3247; E04B 2001/3294; E04B 1/19; E04B 1/1903; E04B 2001/1933; E04B 1/3441; E04B 2001/1927; E04B 9/00; E04C 3/005; E04C 2003/0491; E04C 2003/0486; B64G 9/00; B64G 1/22; B64G 1/66
USPC ........... 52/81.1–81.3, 645, 646, 653.1, 653.2, 52/655.1, 656.9
See application file for complete search history.

(56) References Cited

U.S. PATENT DOCUMENTS 3,359,694 A * 12/1967 Hein .............................. 52/81.2
3,766,932 A * 10/1973 Sidis et al. ................... 135/147
(Continued)

FOREIGN PATENT DOCUMENTS

DE    38 32 546 A1    4/1989
JP    10-313215 A    11/1998

OTHER PUBLICATIONS

Abstract, Database WPI, Week 199906, Thomson Scientific, London, GB (XP 002638287), Nov. 24, 1998, 1 page.

(Continued)

*Primary Examiner* — Adriana Figueroa
(74) *Attorney, Agent, or Firm* — Christensen O'Connor Johnson Kindness PLLC

(57) ABSTRACT

Deployable support structures include a six-bar linkage structure as a lateral facet of a truncated pyramid. The six-bar linkage structure comprises six articulated struts, each coupled to two others by a revolute joint to form a closed loop. The six-bar linkage structure is convertible from a deployed state into a folded state and vice versa. In the deployed state of one embodiment, the six-bar linkage structure forms a trapezoid with two opposing first and second parallel sides formed by two struts arranged in series and coupled by a revolute joint at the center of the parallel sides. In the folded state, the two struts of each parallel side are pivoted around the joint so that opposing end portions of the struts are located side by side. Scalable and modular deployable structures can be made for space applications as well as civil constructions such as domes, roofs, housing, tents, and bridges.

31 Claims, 20 Drawing Sheets

(56) References Cited

U.S. PATENT DOCUMENTS

| | | | |
|---|---|---|---|
| RE31,641 E * | 8/1984 | Derus | 52/109 |
| 4,475,323 A * | 10/1984 | Schwartzberg et al. | 52/111 |
| 4,482,900 A | 11/1984 | Bilek | |
| 4,809,726 A * | 3/1989 | Gillis | 135/136 |
| 4,819,399 A * | 4/1989 | Onoda | 52/646 |
| 4,876,831 A * | 10/1989 | Runyon | 52/70 |
| 4,896,165 A | 1/1990 | Koizumi | |
| 5,230,196 A * | 7/1993 | Zeigler | 52/646 |
| 5,243,803 A * | 9/1993 | Tabata et al. | 52/646 |
| 5,274,980 A * | 1/1994 | Zeigler | 52/646 |
| 5,623,790 A * | 4/1997 | Lalvani | 52/81.2 |
| 5,680,145 A | 10/1997 | Thomson | |
| 5,822,945 A * | 10/1998 | Muller | 52/646 |
| 6,202,379 B1 * | 3/2001 | Meguro et al. | 52/653.1 |
| 6,550,209 B2 | 4/2003 | Meguro | |
| 6,553,698 B1 * | 4/2003 | Kemeny | 40/610 |
| 6,618,025 B2 | 9/2003 | Harless | |
| 6,941,704 B2 * | 9/2005 | Chen et al. | 52/79.5 |
| 7,591,108 B2 * | 9/2009 | Tuczek | 52/80.1 |
| 2001/0005966 A1 | 7/2001 | Meguro | |
| 2009/0199503 A1 * | 8/2009 | Liew et al. | 52/646 |

OTHER PUBLICATIONS

International Search Report mailed Jun. 6, 2011, in International Application No. PCT/EP2010/007044, filed Nov. 19, 2010, 3 pages.

International Preliminary Report on Patentability dated May 30, 2013, in International Application No. PCT/EP2010/007044, filed Nov. 11, 2010, 7 pages.

\* cited by examiner

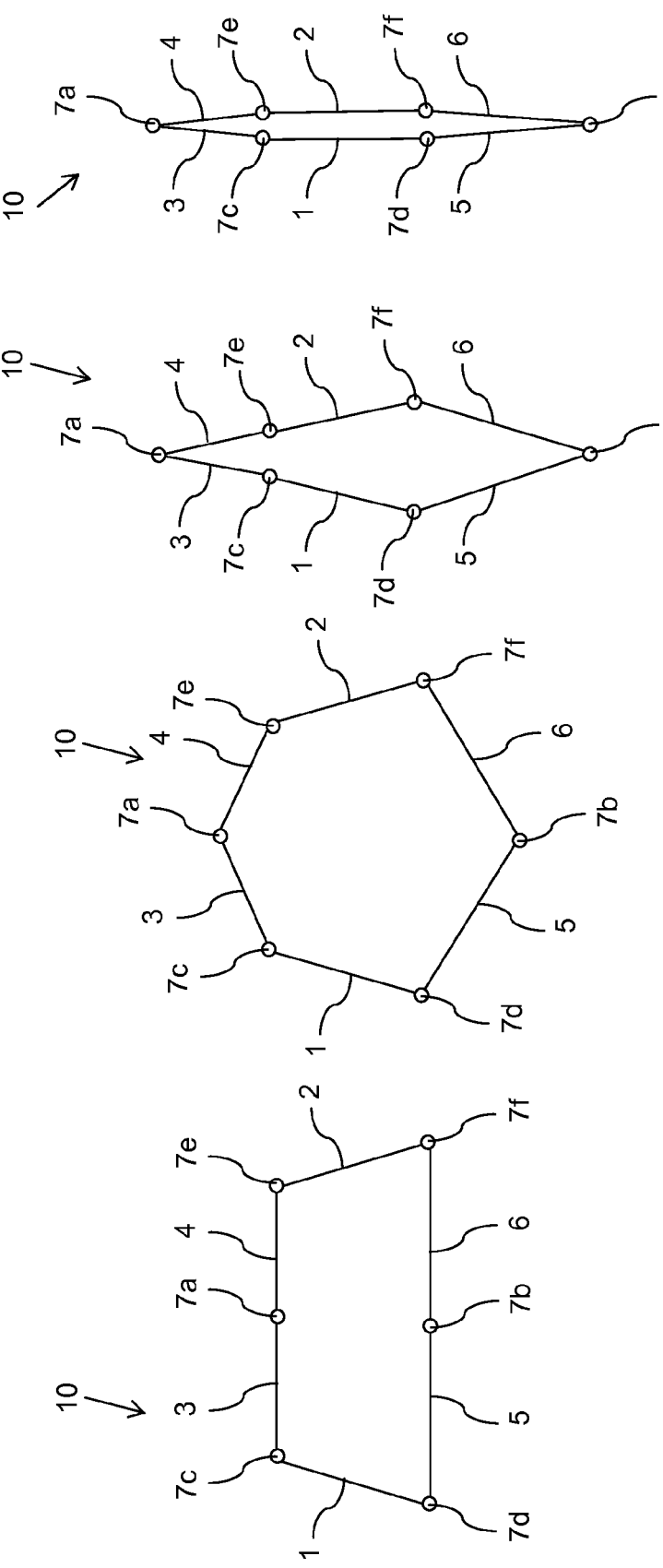

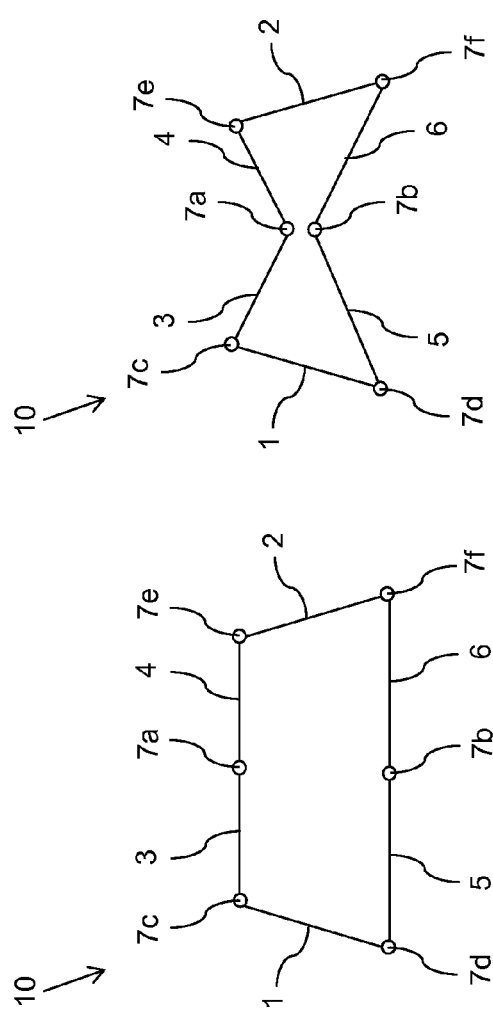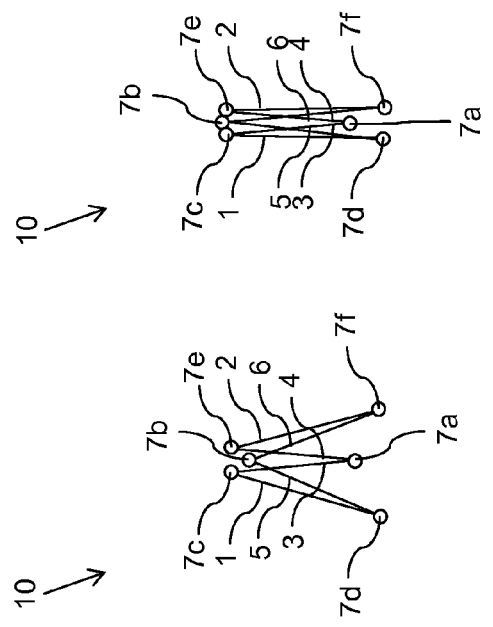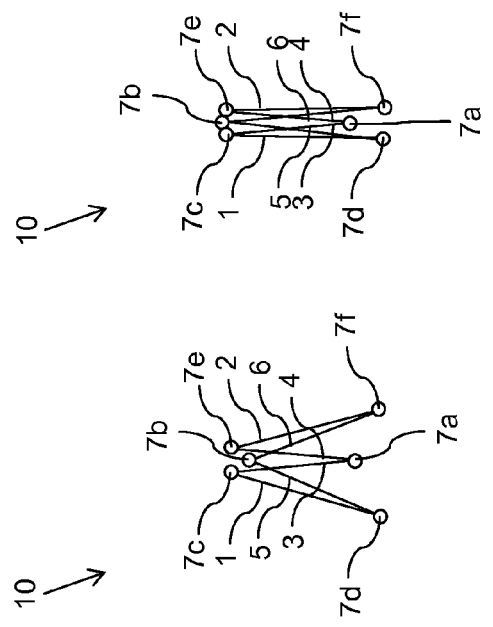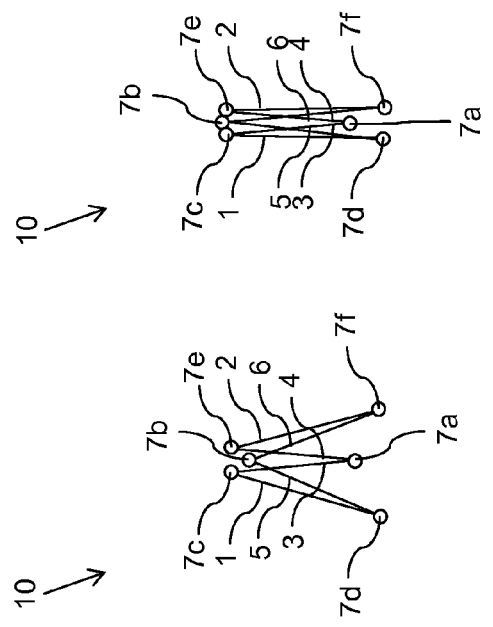

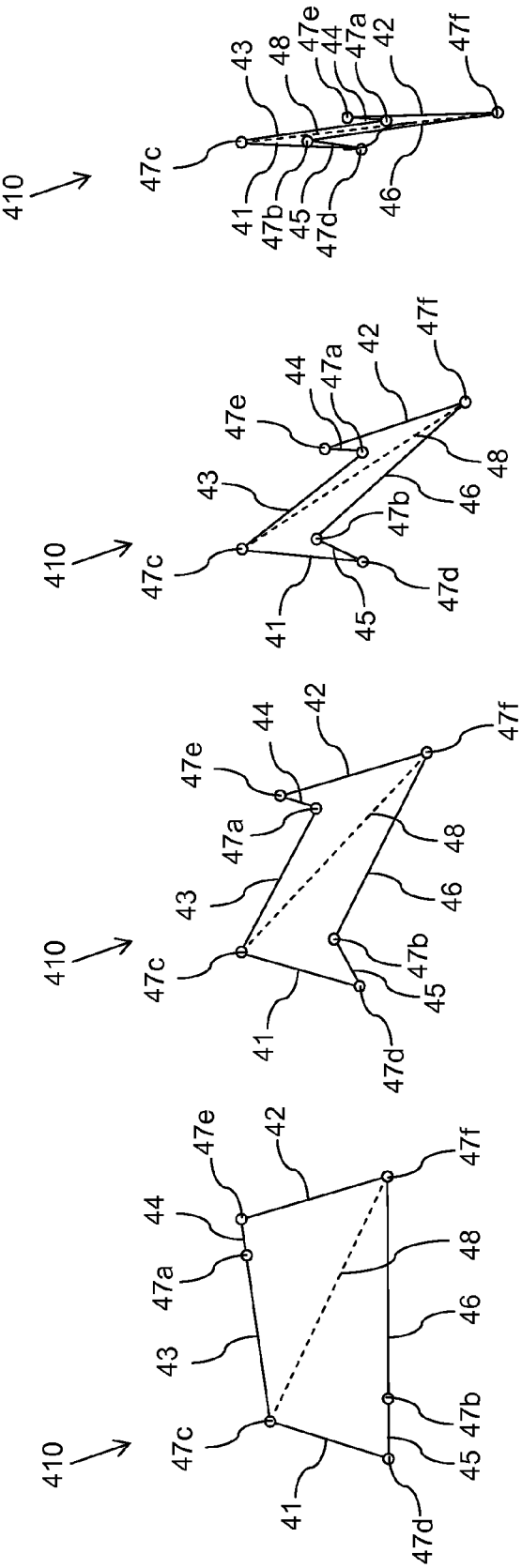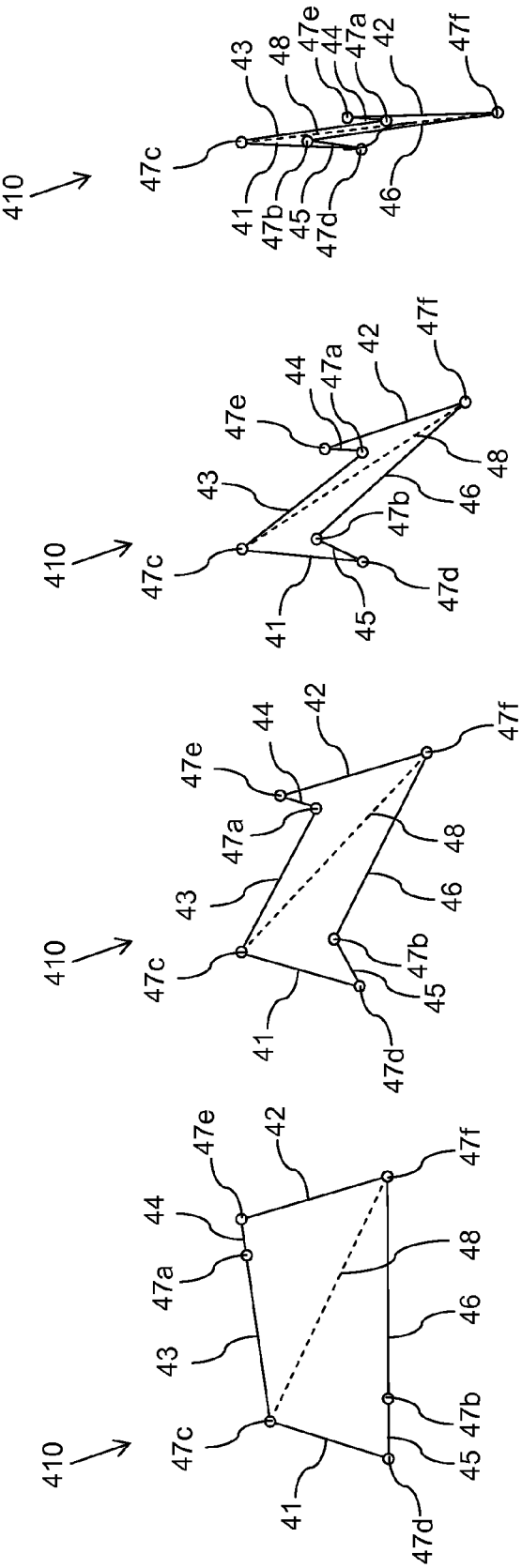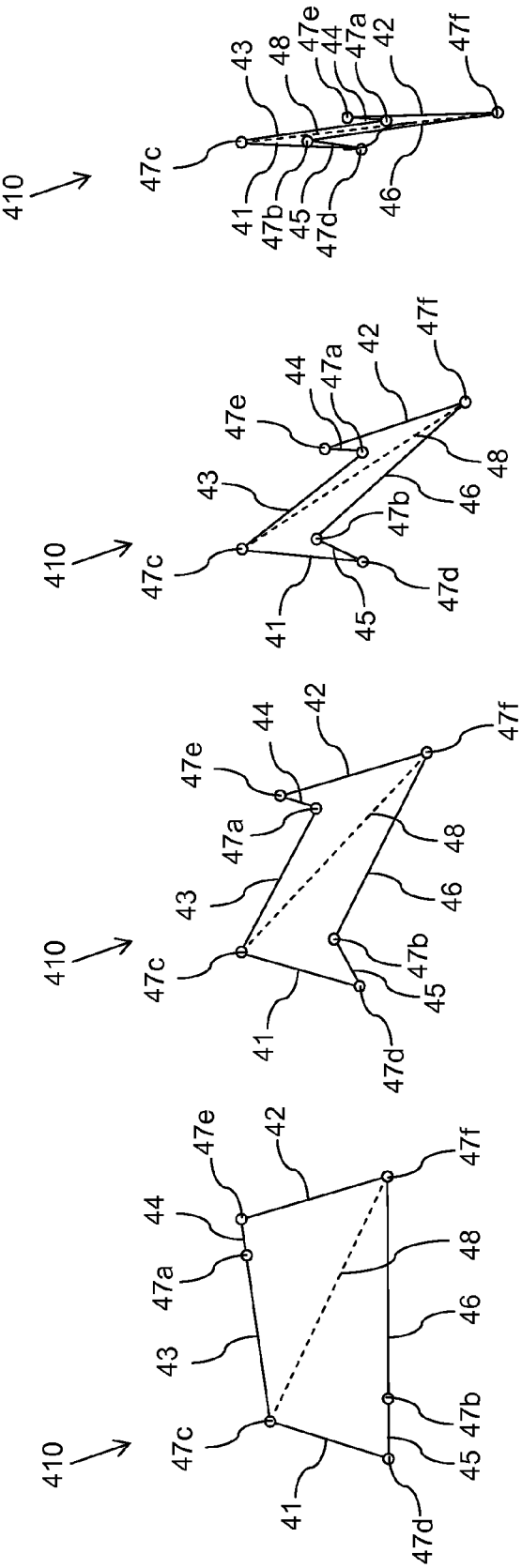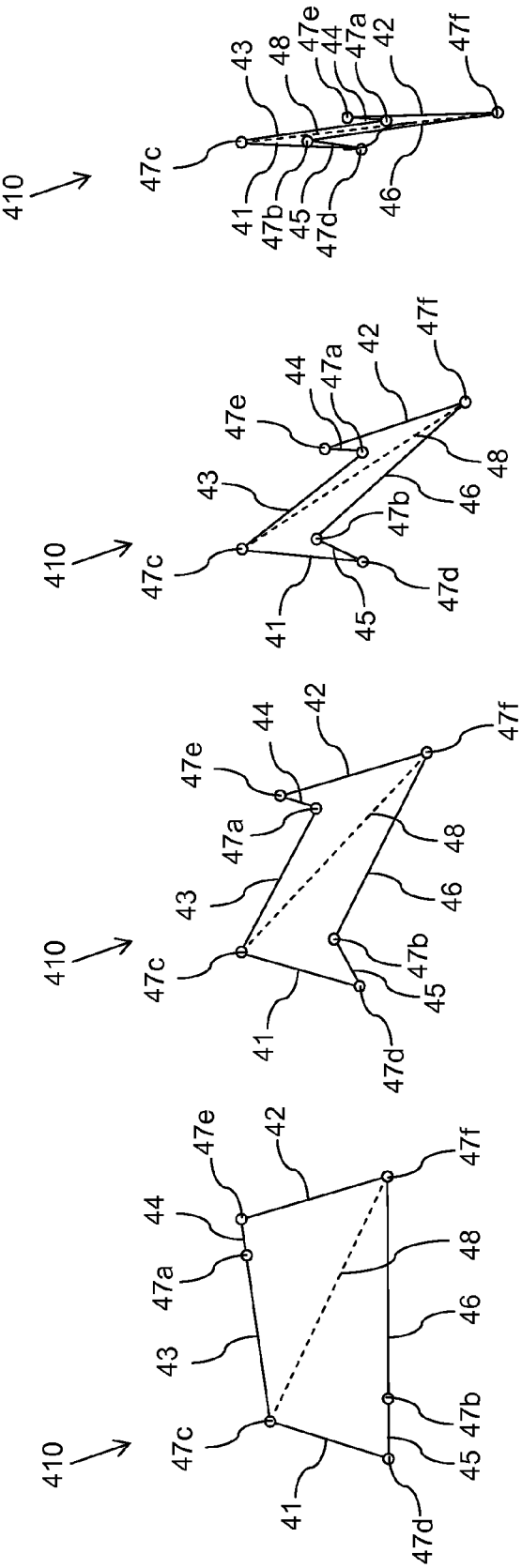

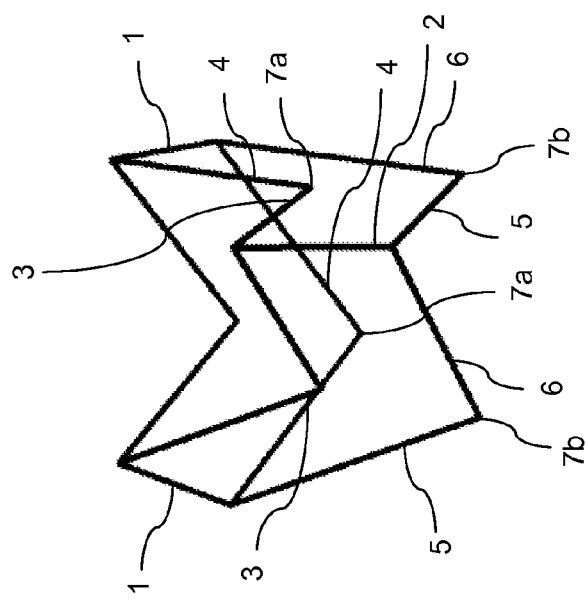
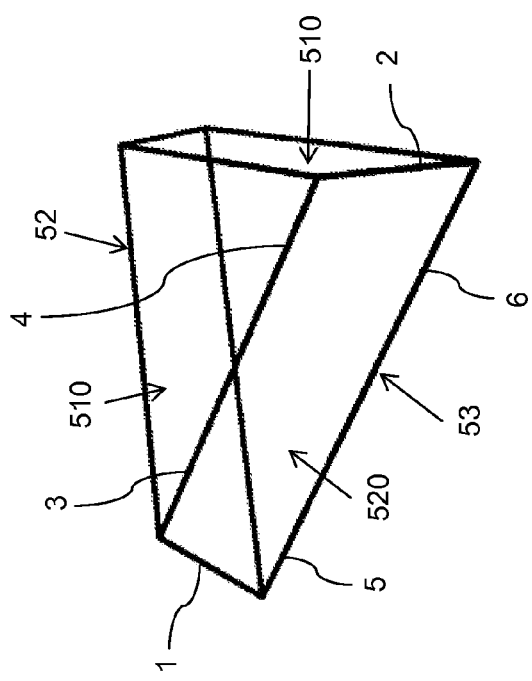

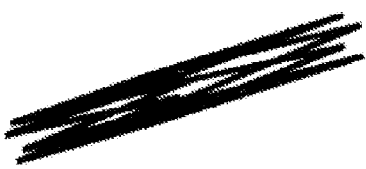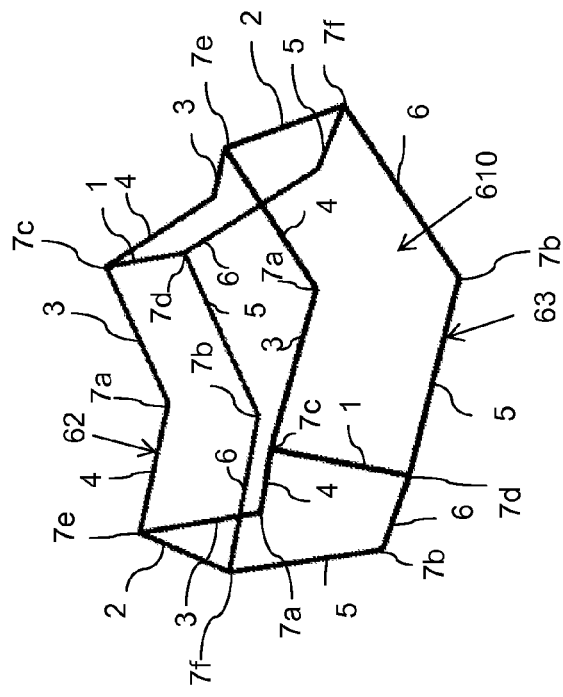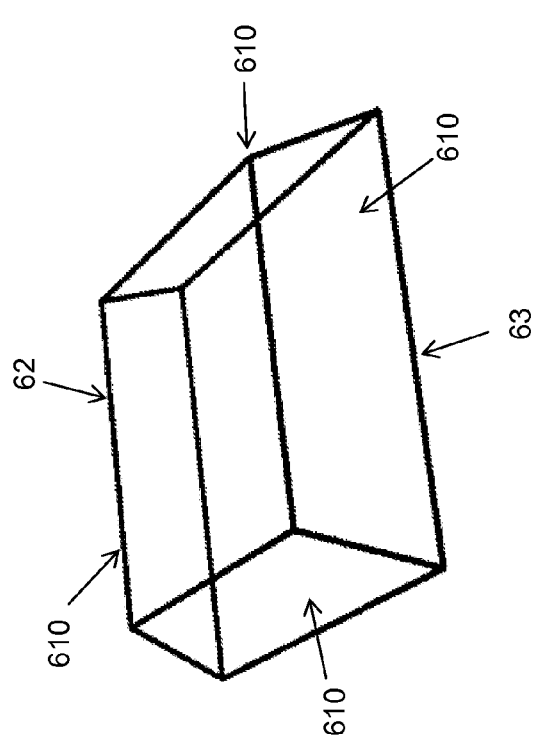

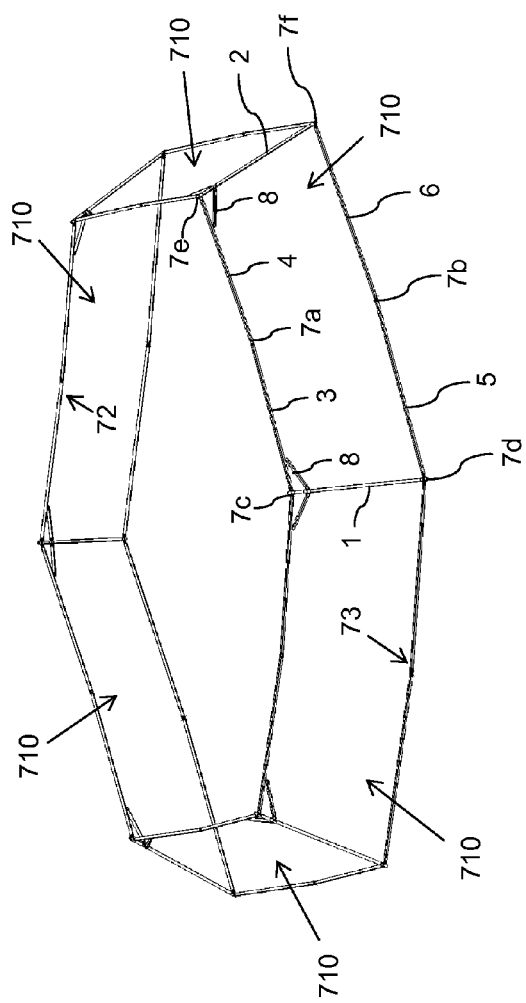
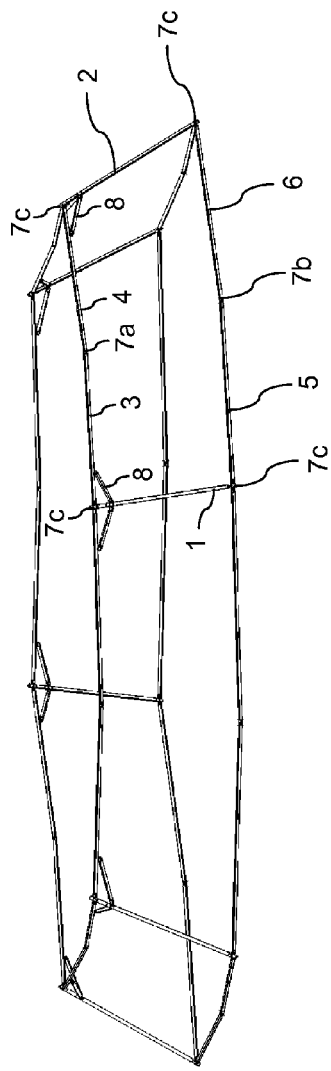
Fig. 7A
Fig. 7B

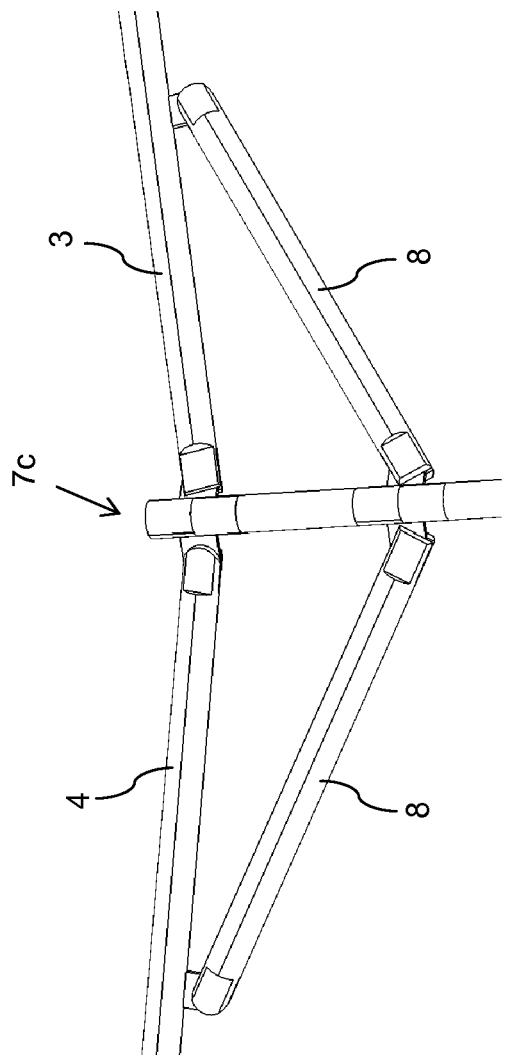

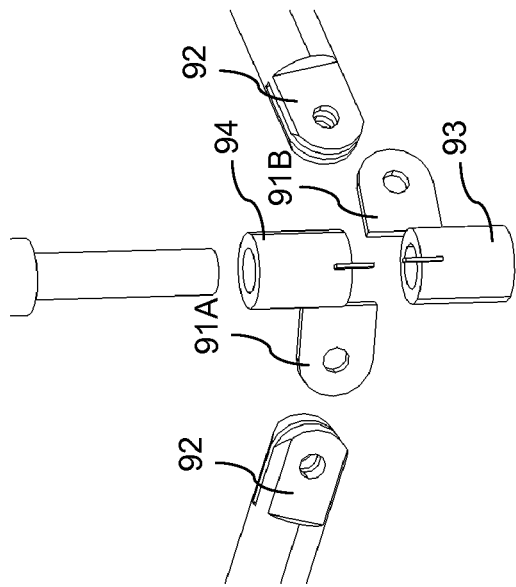
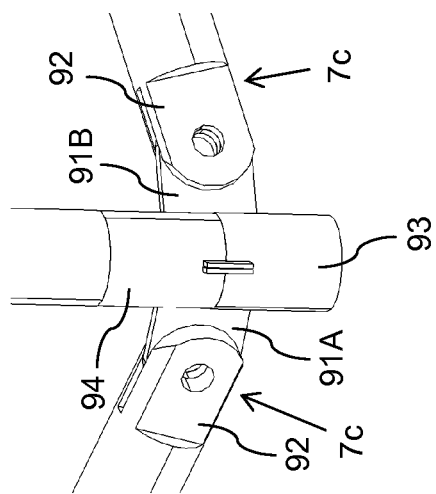

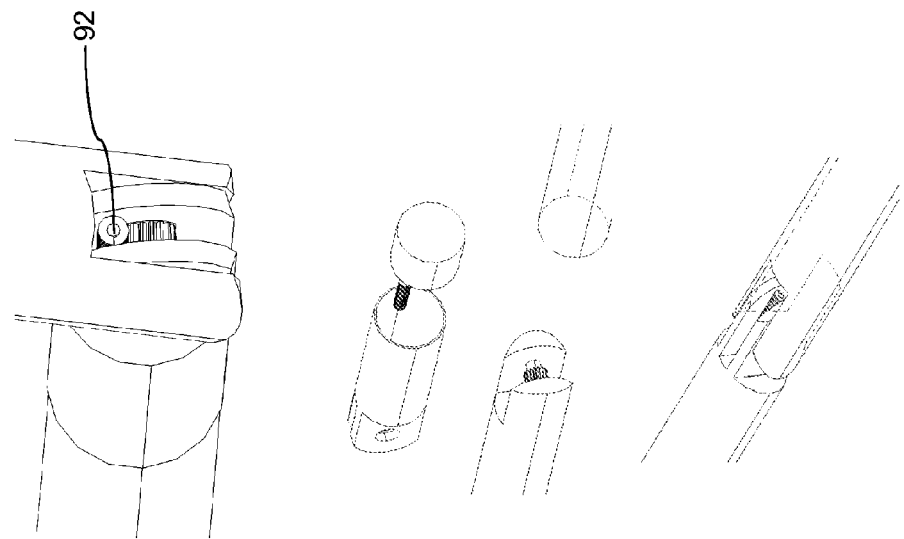
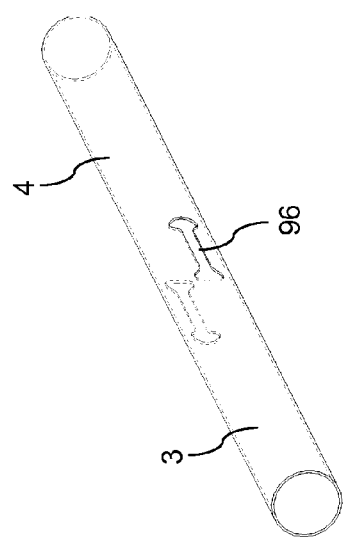

120

120

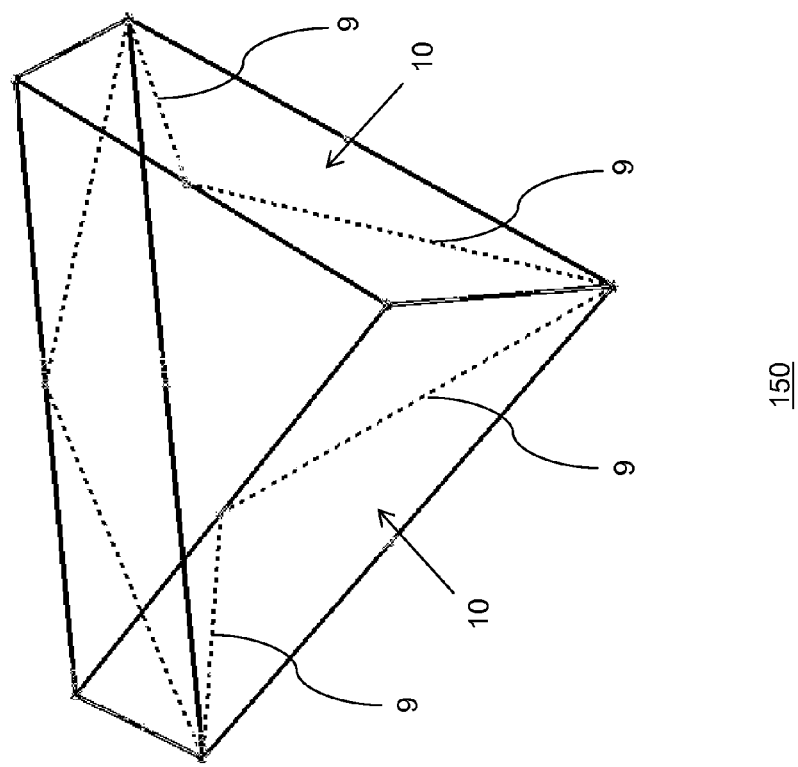

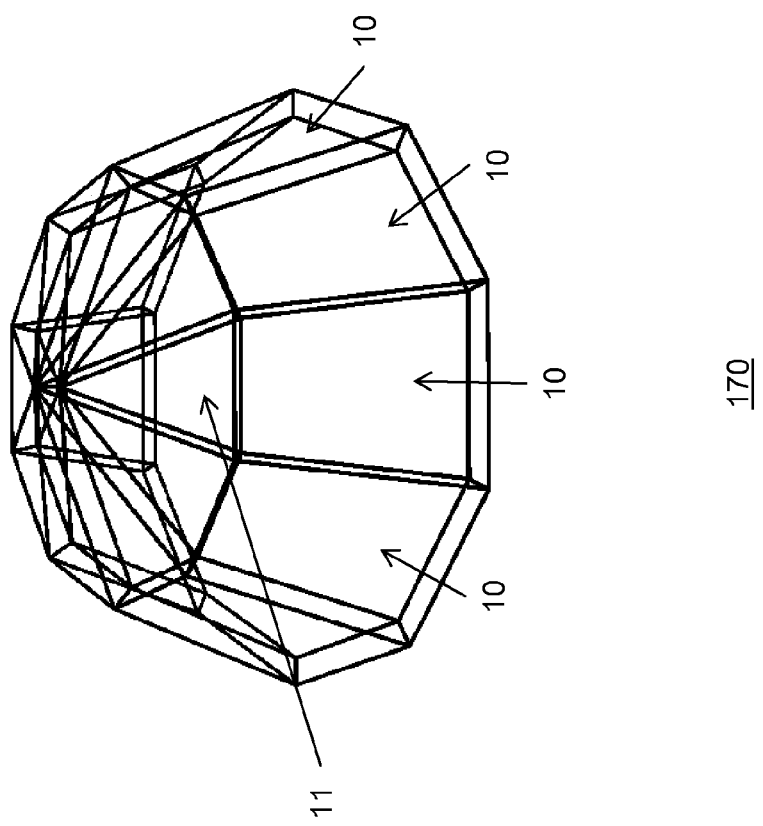

160

160

160

160

LOW WEIGHT, COMPACTLY DEPLOYABLE SUPPORT STRUCTURE

The present invention relates to deployable support structures, such as but not limited to large deployable apertures for space applications.

A particular, but non-exhaustive, application of the invention lies in space applications, where large deployable apertures ranging from 4 to 50 m or more when deployed need to be stowed in compact and folded form on a spacecraft during launch. For illustrative purposes, the invention will be mainly described with reference to the preferred application of the invention, but without limiting its scope in any way thereto.

The use of large antenna reflectors for satellite communication networks is becoming more widespread as demand for mobile communications and broadband services increases. As the required aperture size or number of reflectors per space-deployed communication site increases, the availability of lightweight, compactly packaged antenna structures that can be compactly stowed for transport on a spacecraft is a key prerequisite for the usage of such large apertures. Further difficulties mainly relate to the deployment process reliability, the mass, the stiffness of the structure when deployed and the stability to environmental conditions during the operational life.

The applications for spacecraft are mainly the construction of antenna reflectors for telecommunications, scientific experiments and earth observation, as well as solar reflectors, solar sails and sun shields. On-ground applications can be envisaged in the field of civil engineering and infrastructure, e.g., the construction of deployable domes and roofs, deployable bridges, cranes and towers.

A proposed solution in the prior art is the modular deployable antenna based on a folding scheme and its variants as disclosed in U.S. Pat. No. 6,550,209 B2. The foundation is the kinematics of the transformable facet: a trapezoidal five or six-bar linkage that allows folding of a pyramidal cell, which is in turn the basic element of a modular construction of a parabolic reflector structure. However, the bar-linkage trapezoidal facet, which is the core of the deployable antenna, is still a complex device, with multiple joints of several types, prone to failure. The stowed package dimensions are difficult to reduce. The mass-stiffness efficiency is suboptimal due to the large number and distribution of struts and joints. The RF performance suffers due to the print-through of the backing structure to the reflecting metal-wire mesh (source of periodicity and hence grating lobes) and the gaps between modules (potential source of PIM). The hexagonal cells implemented require a large dimensions excess for the projected aperture coverage.

U.S. Pat. No. 5,680,145 A discloses a deployable reflector in which a peripheral deployable truss structure supports two tension nets acting symmetrically. These nets, when tensioned, cooperate in the stiffness of the whole structure. One of them supports the metal mesh that provides reflectivity. The folding scheme is efficient in terms of packaging ratio and deployed mass-stiffness, however the growth capability is limited due to the required length of the struts and the deployed stiffness and stability.

Another deployable reflector is known from U.S. Pat. No. 6,618,025 B2 adopting a peripheral ring principle, However, the proposed truss requires synchronisation by use of internally running torsion shafts that transmit the movement through complex gear boxes. Hence the deployment reliability and the mass-stiffness trade-off are compromised. These aspects and the mesh tensioning principle seem to be limiting factors in terms of growth capability. In addition, this concept is not suitable for a modular architecture.

In view of the above problems of the prior art, the present invention seeks to provide a low weight, compactly deployable support structure suitable for large deployable apertures. It is a further object of the invention to provide a deployable support structure that enables a flexible modular architecture for building large apertures based on the deployable support structure.

This object is accomplished by the subject-matter according to the deployable support structure of the independent claims. The dependent claims refer to preferred embodiments of the invention.

A deployable support structure based on a six-bar linkage structure is proposed. The six-bar linkage structure comprises six members or bars each coupled to two others by a revolute joint or hinge to form a closed loop. The terms "revolute joint" and "hinge" are used synonymously. Preferably, the six members are articulated struts. Preferably, the articulated struts are of a light-weight, yet rigid material. The six-bar linkage structure is convertible from a deployed state into a folded state and vice versa. Thus, the kinematics of the deployable support structure is reversible.

When in the deployed state, the six-bar linkage structure is forming a trapezoid with opposing upper and lower parallel segmented sides. According to a further aspect, each of the opposing parallel sides are formed by two struts arranged in series and coupled by a hinge at the center of the parallel sides. Thus, in the deployed state, the two non-parallel sides of the six-bar linkage structure are non-segmented and formed by one strut each, whereas the opposing parallel sides are comprised of two struts of equal length arranged in series and coupled by a hinge. The non-parallel struts will be later also referred to as quasi-vertical struts.

When in the folded state, the two struts of the upper side are pivoted around their coupling hinge so that the opposing end portions of these two struts are located substantially side by side or next to each other. When in the folded state, the two struts of the lower side are also pivoted around their coupling hinge so that the opposing end portions of the two struts are located substantially side by side. Thus, the six-bar linkage structure can be converted from a deployed state into a folded state with small width and/or height of the folded package.

According to a further aspect, the revolute joints of the six-bar linkage that provide the basis for the kinematic chains of the rotary linkages may be realized with ball bearings to allow the structure to be deployed with relatively simple kinematics, high-accuracy of rotation and low static and dynamic friction.

According to a further aspect, the revolute joints coupling the two struts of the parallel sides of the trapezoid in the deployed state may move away from each other when the six-bar linkage is being folded from the deployed state into the folded state, resulting in a minimum width folded package of bars.

According to another aspect, the revolute joints coupling the two struts of the parallel sides of the trapezoid in the deployed state may initially move towards each other when the six-bar linkage is being folded from the deployed state into the folded state, resulting in a minimum height folded package of bars.

According to a further aspect, a polyhedron truss is proposed that is constructed with six-bar linkages of the invention as described above in each of a lateral facet of the polyhedron truss. A lateral facet is a lateral flat face on the polyhedron truss as defined by a six-bar linkage. The polyhedron truss is convertible from a deployed state into a folded state and vice versa by converting the six-bar linkages of the lateral facets from the deployed state into the folded state and vice versa. In other words, the six-bar linkage and its kinematics allows folding and/or deployment of the polyhedron truss. Furthermore, in the deployed state, the polyhedron truss has a polygonal truncated pyramidal shape comprising an upper and lower ring of articulated struts. By way of example, in case of a six-bar linkage structure having a trapezoid shape in the deployed state, the upper ring is comprised of the struts of the upper parallel segmented sides of the six-bar linkages of the facets, whereas the lower ring is comprised of the struts of the lower segmented parallel sides of the six-bar linkages of the facets.

According to a further aspect, the struts of the polyhedron truss that correspond to the struts of the non-parallel non-segmented sides of the six-bar linkages may converge towards a predetermined folding point when converting the polyhedron truss from a deployed state into a folded state. Thus, the struts of the polyhedron truss that are perpendicular to the upper and lower rings follow a uniquely determined deployment and/or folding path as defined by the kinematics of the six-bar linkages forming the polyhedron truss.

According to a further aspect, at least some of the revolving joints may be elastically preloaded to provide a deploying force to said struts forming the upper and lower ring of the polyhedron truss when changing from the folded state in the deployed state. By way of example, a spring loaded hinge, a slotted elastic hinge or a hinge with electric actuation and a worm gear in the motor output shaft may be used for powering the deployment of the support structure.

According to a further aspect, the polyhedron truss may comprise a synchronisation means at least one corner coupling two adjacent lateral facets. The synchronization means enables a controlled and synchronized movement of adjacent facets during folding and/or deployment. By way of example, the synchronization means may be a slider along a quasi-vertical struts, i.e. a strut perpendicular to the upper and lower ring struts in the deployed state of the polyhedron truss. The synchronization means may also be a gear box.

According to a further aspect, the struts forming the upper and lower ring of the polyhedron truss may be hinged in a facet plane and pivot-mounted with respect to the non-parallel struts so that a dihedral angle is reduced when converting the polyhedron truss from the deployed state into the folded state. The dihedral angle is the angle between two facets.

According to another aspect of the invention, an alternative six-bar linkage structure is proposed that comprises six articulated struts, each coupled to two others by a revolute joint to form a closed loop; and the six-bar linkage structure is convertible from a deployed state into a folded state and vice versa. In the deployed state, the six-bar linkage structure may form a quadrilateral with all opposing sides being non-parallel. The quadrilateral bar structure may comprise two opposing segmented sides, each segmented side being formed by two struts of different length arranged in series and coupled by a hinge. The quadrilateral bar structure may further comprise two opposing non-segmented sides, each non-segmented side being formed by one strut of different length. In the folded state, the two struts of these opposing segmented sides are being pivoted around their joining hinges.

According to a further aspect, the polyhedron truss may have a truncated hexagonal pyramid shape in the deployed state. In this case, the polyhedron truss comprises six six-bar linkages as described above, wherein adjacent six-bar linkage share a quasi-vertical strut, ie. a strut of the non-segmented sides of the trapezoid in the deployed state.

According to a further aspect, in the deployed state, the polyhedron truss may have a truncated triangular pyramid shape, a truncated quadrilateral pyramid shape or a truncated pentagonal pyramid shape. In these cases, the polyhedron truss comprises three, four, or five six-bar linkages, respectively.

According to a further aspect, a deployment speed of joints that are elastically preloaded may be regulated with an electric actuator connected with a control line attached to the elastically preloaded revolute joints of the upper and lower ring.

According to another aspect, a modular assembly comprising multiple polyhedron trusses is proposed, wherein neighboring polyhedron trusses share a lateral facet. In other words, the foundation of such a modular assembly is the kinematics of the transformable trapezoidal six-bar linkage that allows folding of a pyramidal unit cell, i.e., the polyhedron truss, which is in turn the basic element of a modular construction of a modular assembly, such as a parabolic reflector structure. According to a further aspect, the polyhedron trusses may be of the same type. By way of example, a modular assembly having a ring structure may be formed by combining polygonal trusses of truncated hexahedral pyramid shapes as described above. It is a particular advantage of the present invention, that due to the kinematics of the six-bar linkage, polyhedron trusses of different types may be combined to form a modular assembly. By way of example, polygonal trusses of the truncated hexagonal pyramid shape and the truncated pentagonal pyramid shape may be combined to form a modular assembly wherein neighboring polyhedron trusses share a lateral facet.

According to another aspect, an unfoldable reflector or antenna structure is proposed comprising a modular assembly of the invention. The trapezoidal shape of the six-bar linkages in the deployed state as basic construction elements of such an unfoldable reflector allows for a double curvature of the parabolic reflecting surface of the reflector. The unfoldable reflector or antenna structure may further comprise a continuous mesh of a quasi-symmetrical architecture or a shell-membrane mounted as the reflecting surface on the upper facets of the polyhedron trusses.

According to another aspect, an unfoldable reflector or antenna structure may comprise a scaled assembly and/or further comprise a continuous mesh of a quasi-symmetrical architecture or a shell-membrane mounted as the reflecting surface on the upper facets of the polyhedron trusses, covering a range of dimensions with similar mechanical characteristics.

Although the lightweight, compactly stowable folding geometry of the invention is particularly suited for space deployed applications, where large deployable apertures need to be stowed in compact and folded form on a spacecraft during launch, it should be clear that the invention is not restricted to space applications. The invention finds applications in numerous other fields where the six-bar linkage and a polyhedron truss based on the six-bar linkage can be used as modular building blocks for a large variety of modular assemblies suitable for on-ground applications. For example, according to yet another aspect, a deployable dome structure comprising a modular assembly of the invention is proposed. The deployable dome structure may further comprise a central support column being removable after deployment, and a double layer of plate-shaped material creating an external roof and internal ceiling, separated by an optional isolation. According to yet another aspect, a deployable tent comprising a modular assembly of the invention is proposed. The deployable tent may further comprise a central support column being removable after deployment, and a double layer of textile cloth. According to yet another aspect, a deployable roof comprising an assembly of beams is proposed. The deployable roof may further comprise a double layer of plate-shaped material creating an external roof and internal ceiling, separated by an optional isolation. According to yet another aspect, a deployable bridge structure comprising a modular assembly of faceted cells comprising the six-bar linkages of the invention is proposed.

It is a particular advantage of the invention that it proposes a modular construction principle of the deployable structure, generated by articulated struts. Each module exhibits also scalability properties, increasing hence the flexibility of the design as compared to the prior art. Either a single or multiple-cell architecture can be chosen. The kinematics as defined for the said unit cell also allows using irregular polygons of any number of sides, starting from the truncated tetrahedron up to any number of sides. Each module has a simple geometrical and kinematical foundation, that allows stowing the struts in an efficient manner and also guarantees a controlled deployment, reduced mass and improved stability.

The invention is explained below in an exemplary manner with reference to the accompanying drawings, wherein FIGS. 1A, 1B, 1C, 1D illustrate schematically a folding sequence of a six-bar linkage structure according to an embodiment of the invention;

FIGS. 2A, 2B, 2C, 2D illustrate schematically an alternative folding sequence of a six-bar linkage structure according to an embodiment of the invention;

FIGS. 3A, 3B, 3C, 3D illustrate schematically an alternative folding sequence of a six-bar linkage structure according to an embodiment of the invention;

FIGS. 4A, 4B, 4C, 4D illustrate schematically an alternative six-bar linkage structure and a folding sequence of the six-bar linkage structure according to an embodiment of the invention;

FIGS. 5A, 5B, 5C illustrate schematically a polyhedron truss having polygonal truncated triangular pyramid shape and a folding sequence of the polyhedron truss according to an embodiment of the invention;

FIGS. 6A, 6B, 6C illustrate schematically a polyhedron truss having polygonal truncated quadrilateral pyramid shape and a folding sequence of the polyhedron truss according to an embodiment of the invention;

FIGS. 7A, 7B illustrate schematically a perspective view and a side view of a polyhedron truss having a truncated hexagonal shape in the deployed state according to an embodiment of the invention;

FIG. 8 illustrates schematically a top joint with a synchronisation device of a polyhedron truss according to an embodiment of the invention;

FIGS. 9A, 9B illustrate schematically front view and an exploded view of a bottom joint of a polyhedron truss according to an embodiment of the invention;

FIG. 10C illustrates schematically a perspective view of a slotted elastic hinge according to an embodiment of the invention;

FIG. 10D illustrates schematically different views of a hinge with electric actuation according to an embodiment of the invention;

FIG. 15 illustrates schematically a release control line of a unit cell according to an embodiment of the invention;

FIG. 17 illustrates schematically a deployable tent or dome based on triangular and quadrilateral unit cells according to an embodiment of the invention;

Figure 1D:
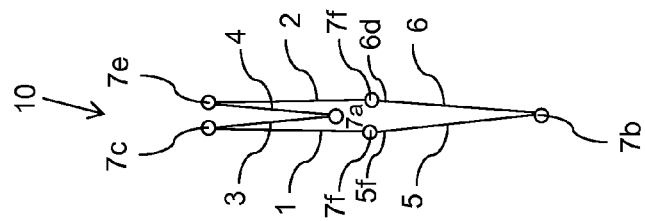

Like numbers refer to like elements throughout. In the schematic illustration of FIGS. 1 through 4, bold lines represent the articulated struts of the support structures. FIGS. 1A, 1B, 1C, 1D illustrate schematically a folding sequence of a six-bar linkage support structure 10 according to an embodiment of the invention. FIG. 1A shows a six-bar linkage structure 10 in a deployed state 10A. The six-bar linkage structure 10 comprises six rigid members or articulated struts 1, 2, 3, 4, 5, 6, each coupled to two others by a revolute joint 7 to form a closed loop. In other words, the struts are hinge-connected to one another in end-to-end fashion at hinge joints 7a-7f, so as to define a closed loop structure. In the deployed state 10A (FIG. 1A), the six-bar linkage structure 10 is forming a trapezoid with two opposing parallel sides, each of the parallel sides are formed by two struts arranged in series and coupled by a revolute joint at the center of the upper and lower parallel sides. For example, the upper segmented side of the trapezoid in FIG. 1A is comprised of a pair of strut elements 3 and 4 that are connected at a folding center revolute joint 7a. Likewise, the two lower struts 5 and 6 are coupled by the center revolute joint 7b. The non-parallel, quasi-vertical sides of the trapezoid in FIG. 1A are formed by one strut, only. The side struts 1 is pivotally coupled to the strut 3 by the revolute joint 7c and pivotally coupled to the lower strut 5 by the revolute joint 7d. Likewise, the side strut 2 forming the second non-parallel side is pivotally coupled to the upper strut 4 by the revolute joint 7e and pivotally coupled to the lower strut 6 by the revolute joint 7f.

Figure 1C:
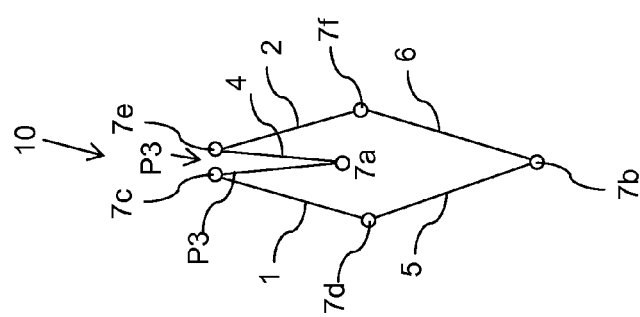
Figure 1B:
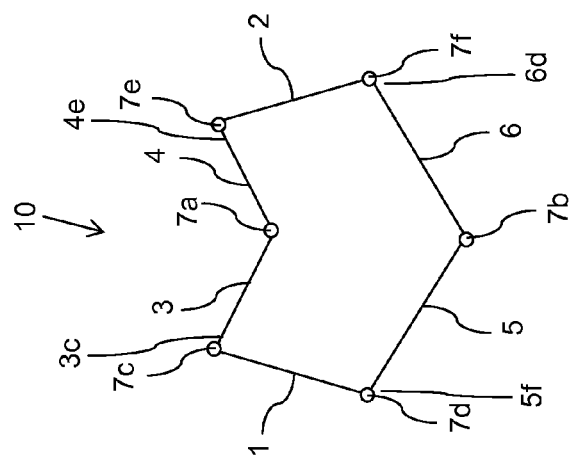
Figure 1A:
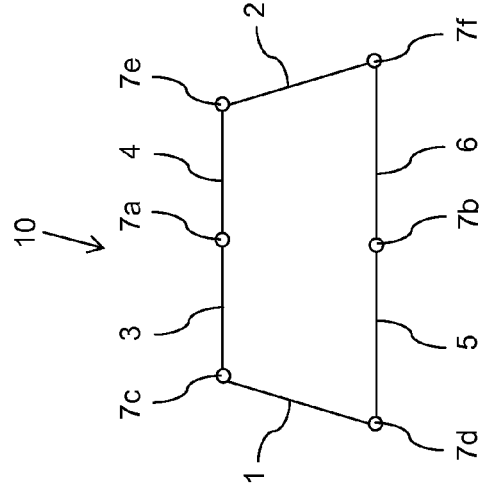

The six-bar linkage structure 10 is convertible from the deployed state illustrated in FIG. 1A into a folded state illustrated in FIG. 1D and vice versa. FIGS. 1A through 1D schematically illustrate the folding sequence for the foldable six-bar linkage structure 10, beginning with its deployed configuration (FIG. 1A), through successive intermediate folding states (FIG. 1B, FIG. 1C), to the fully folded condition (FIG. 1D) of the hinged linkage structure.

A driving mechanism, e.g. provided by elastically preloading some of the hinges (not shown, cf. FIGS. 10A-10D) enables the structure to deploy. By synchronous operation of the driven hinges, e.g. the hinges 7a and 7b, the struts 3-6 of the opposing parallel sides in the deployed state fold from a generally horizontal direction in their deployed condition of FIG. 1A to a generally quasi-vertical direction in their fully folded condition of FIG. 1D. In the partially deployed condition of FIG. 1B, the upper struts 3, 4 have pivoted or rotated inwardly (with respect to the trapezoid shape) around the upper corner hinge joints 7c and 7e, while the two lower struts 5 and 6 are pivoted outwardly from their generally horizontal condition in the deployed state of FIG. 1A. In the folded state of FIG. 1D, the two struts 3, 4 of the upper side have pivoted around the upper central hinge 7a so that the opposing end portions 3c, 4e of these struts 3 and 4 are located side by side. Similarly, the two struts 5,6 of the lower side have pivoted around the lower center hinge 7b so that the opposing end portions 5f, 6d of the two struts 5, 6 are also located side by side.

The construction principle of the six-bar linkage structure provides a kinematical foundation that ensures a controlled deployment or folding according to a predetermined folding/deployment sequence. For example, when converting the six-bar linkage structure from a deployed state into a folded state, the quasi-vertical struts 1, 2 converge towards a folding point, illustrated as P3 in FIG. 1C. Furthermore, the construction principle of the six-bar linkage structure allows stowing the struts in an efficient manner and also enables reduced mass and improved stability.

FIGS. 2A through 2D schematically illustrate the deployment sequence for the foldable six-bar linkage of another embodiment of the invention, beginning with its deployed configuration (FIG. 2A), through successive partially deployed/folded conditions (FIG. 2B, FIG. 2C), to the fully folded condition (FIG. 2D) of the six-bar linkage kinematics. The embodiment shown in FIGS. 2A through 2D differs from the six-bar linkage by the folding/deployment scheme. Therefore, the same reference number is assigned to the same component as the one in the embodiment shown in FIGS. 1A to 1D to simplify the description.

In the partially deployed condition of FIG. 2B, the upper struts 3, 4 have pivoted or rotated outwardly (with respect to the trapezoid shape) around the upper corner hinge joints 7c and 7e, while the two lower struts 5 and 6 are also pivoted outwardly from their generally horizontal condition in the deployed state of FIG. 1A. In other words, the broken upper and lower bars, i.e. the two upper struts 3, 4 and the two lower struts 5, 6 fold in opposite directions away from the barycentre, leading to a minimum width of the package.

Yet another folding scheme of the six-bar linkage 10 is illustrated in FIGS. 3A-3D which enables a minimum height of the folded linkage structure. Again, the same reference number is assigned to the same component as the one in the embodiment shown in FIGS. 1A to 1D to simplify the description. The stowed length of the folded reflector package is reduced by pivoting the broken upper 3, 4 and lower 5, 6 bars inwardly from their generally horizontal condition in the deployed state of FIG. 3A, thus they fold towards the barycentre, leading to a minimum height of the package. In this embodiment, the connections of the bars are alternated in the direction across the plane to avoid physical interference of the bars during folding or deployment.

Another embodiment of the six-bar linkage 410 is described in FIGS. 4A through 4D. As illustrated schematically, the kinematics can be extended, without loss of stability, to unequal lengths and non-parallel top and bottom sides of the deployed quadrilateral facet 410. According to this embodiment, the six-bar linkage structure 410 comprise six articulated struts 41, 42, 43, 44, 45, 46, each coupled to two others by a revolute joint 47 to form a closed loop. The six-bar linkage structure 410 is convertible from a deployed state (FIG. 4A) into a folded state (FIG. 4D) and vice versa. In the deployed state, the six-bar linkage structure 410 forms a quadrilateral with all opposing sides being non-parallel, wherein a first and a second opposing side are each being formed by two struts 43, 44 and 45, 46 of different length arranged in series and coupled by the hinge 47a or 47b. The other two opposing sides are non-segmented and formed by one strut only (strut 41 and strut 42, respectively) In the folded state 410D, the two struts 43, 44; 45, 46 of the first and second sides are pivoted around their joining hinges 47a, 47b. In this embodiment, the more complex folding and unfolding processes may result in uncontrolled trajectories and risk of blocking during deployment, especially when several facets are connected. This depends on the particular design parameters, although it can be solved if needed by adding an optional bar 48, which is represented in FIGS. 4A through 4D with a dashed line. By insertion of this bar 48 of constant length, the kinematics is uniquely determined for each half of the facet, with the only condition of compatible lengths of the struts 45, 46, 41 versus the bar 48 and the struts 43, 44, 42 versus the bar 48. This stabilising bar 48 also provides improved stiffness when deployed, at the cost of more mass and larger package size.

All of the above described six-bar linkages and folding schemes for the facet of the unit cell can be used as modular building blocks that allow constructing doubly curved surfaces without telescopic or sliding elements. In the following, this is illustrated based on the six-bar linkage and folding scheme shown in FIGS. 1A through 1D, only for the sake of brevity.

The FIGS. 5-7 illustrate schematically different types of polyhedron trusses having a polygonal truncated pyramid shape in which six-bar linkages as described above are used as the building blocks in each of the lateral facets.

As a first embodiment, FIGS. 5A through 5C illustrate schematically a folding sequence of a polyhedron truss having truncated triangular pyramid shape. An alternative embodiment is illustrated in FIG. 6A through 6C, showing a polyhedron truss 60 having a polygonal truncated quadrilateral pyramid shape that is formed by six-bar linkages of the present invention in each of its four lateral facets 610.

The polyhedron trusses 50 and 60 are constructed with six-bar linkages as described in FIGS. 1A to 1D in each of the lateral facets 510, 610 of the polyhedron truss 50, 60. The polyhedron truss is convertible from a deployed state (FIG. 5A, FIG. 6A) into a folded state (FIG. 5C, FIG. 6C) and vice versa by converting the six-bar linkages of the lateral facets 510, 610 from the deployed state into the folded state and vice versa. In the deployed state, the polyhedron truss 50A, 60A has a polygonal truncated pyramidal shape comprising an upper 52, 62 and lower 53, 63 ring of articulated struts 3, 4, 5, 6. The upper ring 52 of the polyhedron truss in FIG. 5A comprises three ring segments, whereas the upper ring 62 of the polyhedron truss in FIG. 6A comprises four ring segments. Each of the upper ring segments is comprised by two struts 3, 4 arranged in series and coupled by a revolute joint 7a at the center of the upper ring elements. The two struts 3, 4 correspond to the two upper struts 3, 4 of the six-bar linkage shown for example in FIG. 1A. Likewise, the lower ring 62 comprises three ring segments (or four for the polyhedron truss in FIG. 6A) and each of the lower ring segments is comprised by two struts 5, 6 arranged in series and coupled by a center revolute joint 7b. The upper 52, 62 and lower 53, 63 rings are connected by the struts 1, 2 that correspond to the struts 1, 2 of the six-bar linkages shown in FIGS. 1A-3D, wherein two adjacent six-bar linkages are kinematically coupled by sharing a quasi-vertical struts 1 or 2. Thus, the polyhedron truss 50 is comprised by three six-bar linkages, wherein two adjacent six-bar linkages share a quasi-vertical strut 1, 2, whereas the polyhedron truss 60 is comprised by four six-bar linkages, wherein two adjacent six-bar linkages also share a quasi-vertical strut 1, 2. Since the polyhedron truss is comprised of six-bar linkages shown in FIG. 1A, the same reference number corresponding to a strut of FIG. 1A is assigned to the corresponding strut in the embodiment shown in FIGS. 5A to 5C and FIGS. 6A to 6C to simplify the description.

FIGS. 5A through 5C schematically illustrate the folding sequence for the foldable polyhedron truss having a truncated triangular pyramid shape, beginning with its deployed configuration 50A (FIG. 5A), through successive partially deployed/folded conditions (FIG. 5B), to the fully folded condition (FIG. 5C) of the polyhedron truss 50. In order to avoid complicating the drawings, only the upper 52 and lower 53 ring of articulated struts and the quasi-vertical struts 1, 2 of the six-bar linkages 510 are shown in FIGS. 5A-5C but not the revolute joints 7a-7f located at each of the corner of the polyhedron truss and at the center of the upper and lower ring elements.

For example, in the partially deployed/folded state shown in FIG. 5B, the struts of the upper and lower ring segments have pivoted or rotated from the corner hinge joints. The folding and/or deployment is done in such a way that the folding is compatible for all the facets 510, which is achieved by making the quasi-vertical struts 1, 2 of the six-bar linkages convergent to a folding point when converting the polyhedron truss 50 from a deployed state into a folded state. The struts 3, 4, 5, 6 forming the upper 52 and lower ring 53 are hinged in a facet plane and pivot-mounted with respect to the quasi-vertical struts 1, 2 so that the dihedral angle is reduced when converting the polyhedron truss from the deployed state into the folded state. Preferably, the center revolving joints 7a and 7b are elastically preloaded to provide a deploying force to said struts 3, 4, 5, 6 forming the upper 52 and lower ring 53 when changing from the folded state in the deployed state. This is explained in more detail in FIGS. 10A to 10D. It is a particular advantage of the proposed construction principle that only hinge joints are required. The 3 degrees of freedom of this six-bar linkage are controlled by the geometrical construction of the unit cell 50, the synchronisation of neighbouring facets 510 rotations and the closed ring structure. A corresponding folding scheme is shown in FIGS. 6A through 6C for the quadrilateral polyhedron truss.

FIGS. 7A and 7B illustrate schematically a perspective view and a side view of a polyhedron truss 70 having a truncated hexagonal shape in the deployed state according to another embodiment of the invention. Similar to the polyhedron trusses shown in FIGS. 5A and 6A, the polyhedron truss 70 comprises the six-bar linkages shown in FIG. 1A in each of the lateral facets 710 of the polyhedron truss 70. The polyhedron truss 70 further comprises a slider 8 as a synchronisation means at the top corners coupling two adjacent lateral facets 710. The details of the slider 8 as shown in FIG. 8 that illustrates schematically a top joint with a slider of a polyhedron truss according to an embodiment of the invention. The slider comprises two bars 8 coupling the quasi-vertical strut 1, 2 with a strut 3, 4 of the upper ring and moves downwardly the quasi-vertical struts 1, 2, when the polyhedron truss is converted from the deployed state into the folded state.

FIGS. 9A, 9B illustrate schematically a front view and an exploded view of a bottom revolute joint of a polyhedron truss where appropriate ball bearings are used for reduction of friction and control of joint play. In principle, only revolute joints (1 DOF hinges) are needed in each joint, which is a significant improvement as compared to the prior art. The bottom joint comprises a bottom 93 and a top 94 swivel part enabling the swiveling of the facets of the polyhedron truss. The bottom swivel part 93 is fixed to the axis of the quasi-vertical strut 1, 2 and the top one 94 can rotate by means of bearings. Both swivel parts 93, 94 include an end-stop contact. The swivel is also present at the top joint (cf. FIG. 8). All the ring struts 3, 4, 5, 6 of the upper and lower ring are hinged in the facet plane, but also swivelled with respect to the quasi-vertical strut 1, 2 to which they are connected, in order to free the dihedron angle between lateral facets. The reason is that, due to the folding sequence, in a first instance the angles of the quasi-vertical struts may be kept constant in order to follow a unique transformation path as illustrated in FIGS. 1A through 1C. When the tops of the quasi-vertical struts 1, 2 converge (cf. FIG. 1C), the next step is to reduce the facet dihedra angles, in order to be able to further close the package to an aligned bundle of bars. This is the folding sequence of the facet shown in FIGS. 1A through 1D. The last step (corresponding to the folding of the six-bar-linkages in the lateral facets as shown in FIG. 1C to FIG. 1D) is the one in which the dihedron angle has to be reduced to its minimum value, defined by the corresponding polygonal prism, e.g. 120 degrees in the case of the regular hexagonal unit cell. The deployment follows the reverse uniquely determined path: first the bottom end of the quasi-vertical struts is released and hence the lower ring intends to expand initially, forcing the facet dihedra angles to reach their stop value (the one of the pyramid containing the unit cell). This angle is only slightly larger than for the corresponding prism in the cases of moderately curved surfaces. The second phase is a controlled release of all the synchronically connected facets, which expand keeping the facet dihedra constant, which in fact fixes the angle of the quasi-vertical struts. Given the degrees of freedom of such a truss, it is preferred to elastically preload several joints, especially the joints 7a, 7b in the middle of the upper and lower bars, for motorisation but mainly control of the trajectories along a uniquely determined path. In this case, the hinges at the outer perimeter corner joints are passive (non-driven) hinges. In addition to the above described folding and release sequence, a combined or simultaneous operation is also possible, with the advantage of reducing the complexity of release steps, but with the risk of reaching singular points of deployment when the geometrical relations are not carefully studied.

Figure 10A:
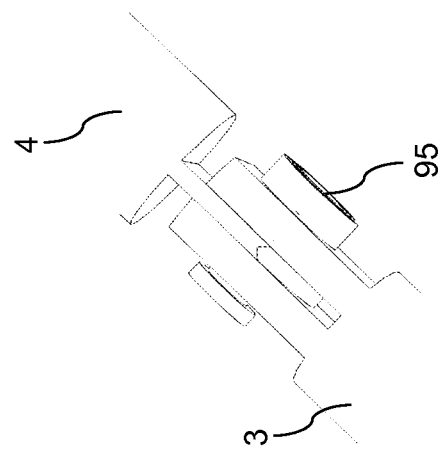
FIGS. 10A, 10B illustrate schematically a perspective view and a top view of a spring loaded hinge according to an embodiment of the invention.
Figure 10B:
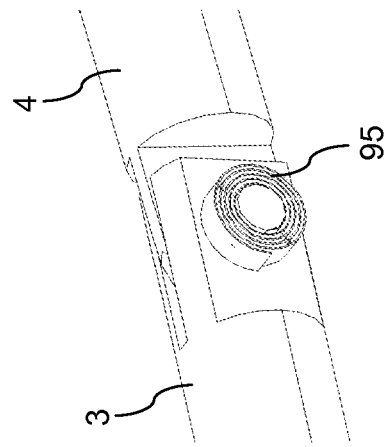

Elastically preloaded joints are illustrated in FIGS. 10A and 10B that show schematically a perspective view and a top view of a spring loaded hinge according to an embodiment of the invention. The struts 3 and 4 of the upper ring are coupled using a revolute joint comprising a coil spring 95 that is elastically preloaded to provide a deployment force for unfolding the stowed support structure. According to a further embodiment illustrated in FIG. 10C, instead of a spring loaded hinge, a slotted elastic hinge 96 in a continuous tube can be employed. Yet another alternative is illustrated schematically in FIG. 10D that shows different views of a respective hinge that includes an electric actuation and a worm gear 97 in the motor output shaft that is configured to transmit power through a moving hinge to effect opening or closing thereof. Synchronously driving the hinges with a driving mechanism shown in any of the FIGS. 10A to 10D enables the structure to fold in a manner consistent with powered, synchronous deployment. Ideally, for a space-deployed environment (such as a satellite antenna), where gravitational forces are nearly zero, the force required to open the hinge should be minimal. However, for terrestrial applications, deployment loads may be significant.

Figure 11A:
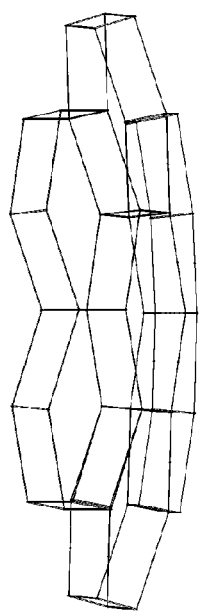
FIGS. 11A, 11B, 11C illustrate schematically different views of a modular assembly with polyhedron trusses of the same type as unit cells according to an embodiment of the invention.
Figure 11B:
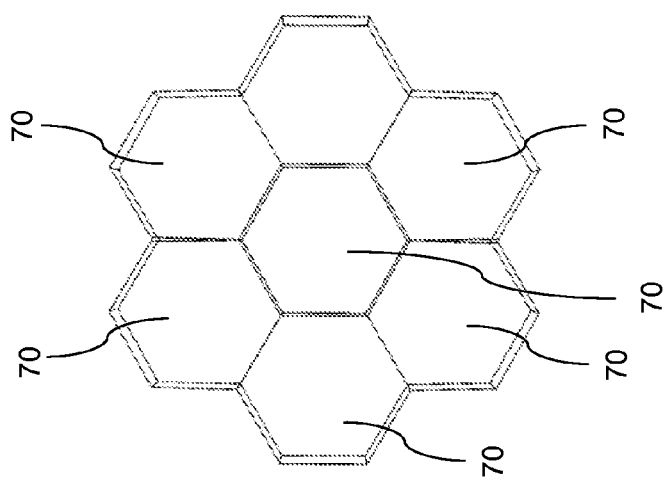
Figure 11C:
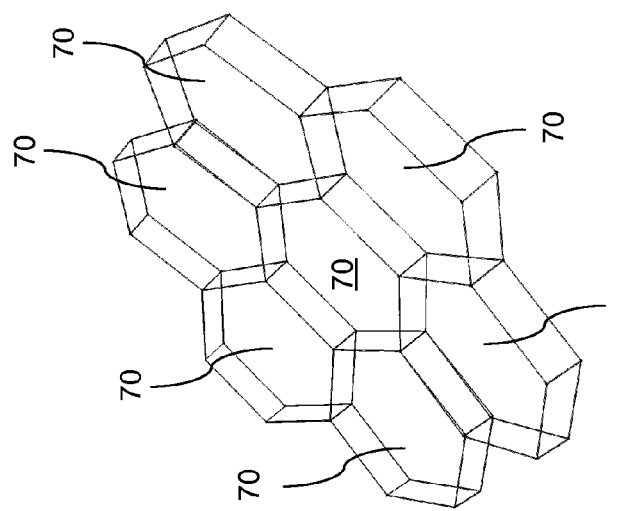
Figure 12B:
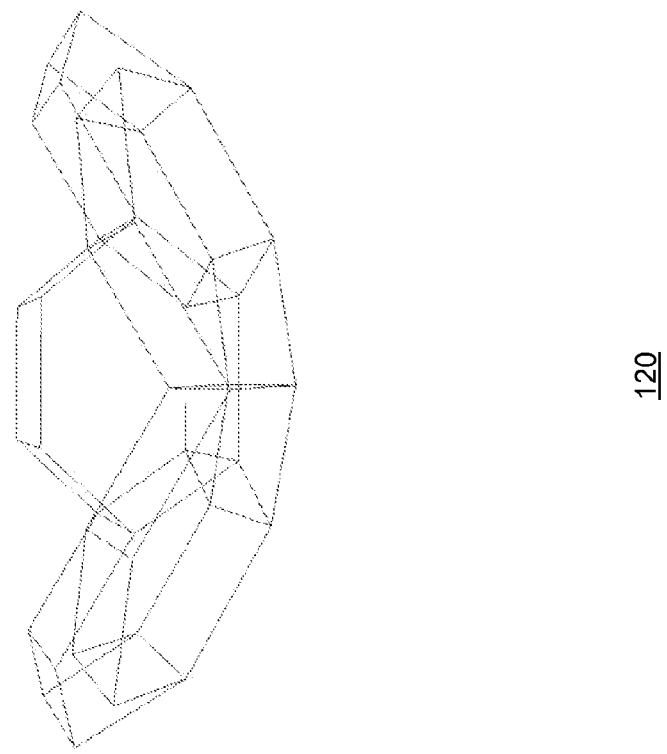
FIGS. 12A, 12B illustrate schematically different views of a modular assembly with polyhedron trusses of different types according to an embodiment of the invention.
Figure 12A:
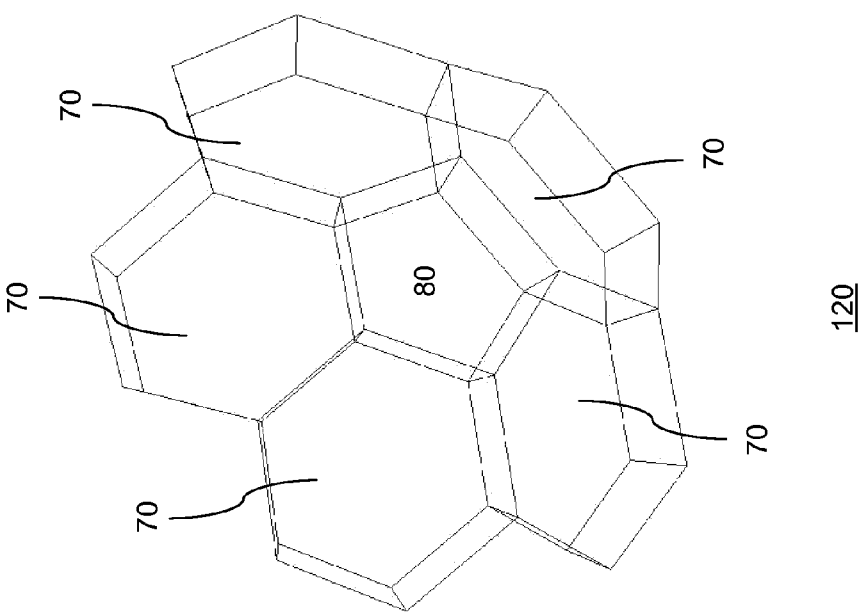
Figure 13A:
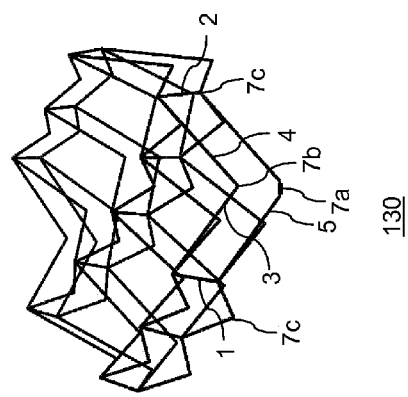
FIGS. 13A, 13B, 13C, 13D illustrate schematically a folding sequence of a modular assembly according to an embodiment of the invention.
Figure 13C:
Figure 13B:
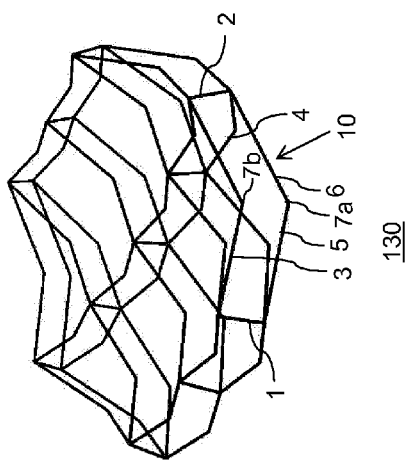
Figure 13D:
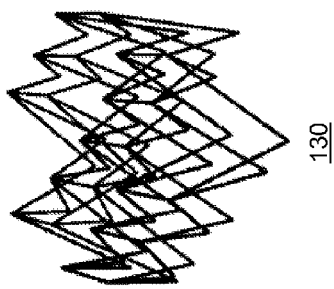
Figure 14A:
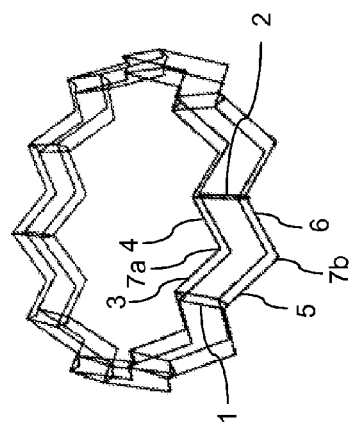
FIGS. 14A, 14B, 14C, 14D illustrate schematically a folding sequence of a ring-type modular assembly according to an embodiment of the invention.
Figure 14B:
Figure 14C:
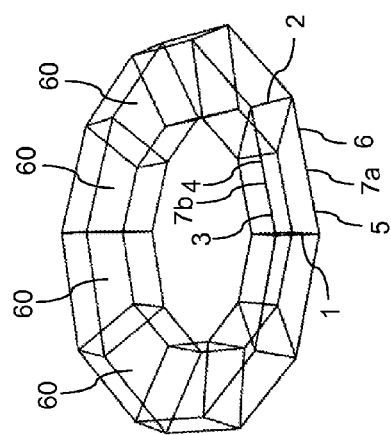
Figure 14D:
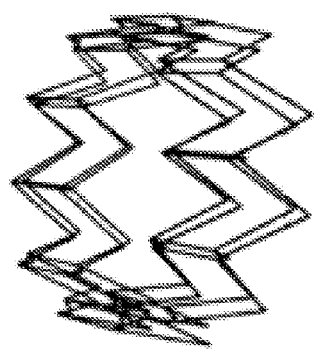

The explanation for the deployable truss according to the present invention has been completed as described above. Now, a modular assembly and/or modular deployable antenna containing the above described deployable trusses as the basic modules will be described hereinbelow. The unit cell (polyhedron trusses) described in FIGS. 5 to 7 can be used as modular building blocks to construct modular assemblies wherein neighbouring polyhedron trusses share a lateral facet. By way of example, FIGS. 11A to 11C illustrate schematically different views of a modular assembly 110 with polyhedron trusses of the same type as unit cells according to an embodiment of the invention. The modular assembly according to the embodiment shown in FIG. 11A is constituted by combining plural modules 70 each having a shape of hexagonal truncated pyramid, wherein the modules 70 are connected to adjacent modules by sharing a facet or side surface. According to another embodiment, FIGS. 12A and 12B illustrate schematically different views of a modular assembly 120 with polyhedron trusses of different types. The approximate spherical structure is characterized by providing one basic module 80 formed into the shape of a regular pentagonal truncated pyramid, and radially located modules 70 each having a shape of a hexagonal truncated pyramid so as to approximate a spherical surface.

One advantage of the present invention is the simplicity of the construction described as illustrated in FIGS. 11-12. Neighbouring cells share facets and are hence automatically synchronised. The difference of this invention with respect to the prior art is that with the said facet and unit cell kinematics, the unit cell can be any polygonal truncated pyramid and several different polygons can be combined, even irregular ones. An embodiment combining hexagons 70 and pentagons 80 is shown in FIGS. 12A and 12B. Each module exhibits also scalability properties, but requires a smaller amount of structural elements and hinges as similar constructions know from the art. This increases hence the flexibility of the design as compared to the prior art. The stiffness in deployed configuration is achieved by the geometry of the facets and the inertia distribution. In addition, the synchronisation devices increase the stiffness, as well as the possibility of controlling the release devices in a reversed direction when the structure is deployed and latched. Either a single or multiple-cell architecture can be chosen. Each module has hence a simple geometrical and kinematical foundation, that allows stowing the struts in an efficient manner and also guarantees a controlled deployment, reduced mass and improved stability. As will be appreciated from the foregoing description, configuring a modular assembly in this manner based on a polyhedron truss as a unit cell which in turn is based on the six-bar linkage support structure allows the unit cells to be used as 'building blocks' that can be replicated and interconnected to other polyhedron trusses by sharing a facet to realize a modular polygonal architecture of an arbitrary number of units. Thus the size of the modular assembly may be increased by adding more unit cell (polyhedron trusses).

In the prior art, the cell geometry requires regularity and an even number of sides of the polygon. By contrast, those limitations are no longer required using the proposed unit cells in FIGS. 5 to 7. The kinematics as defined for the said unit cell allows using irregular polygons of any number of sides, starting from the truncated tetrahedron up to any number of sides. The unit cell can be packaged to a line. The only point to consider in this case is the diverse lengths of the folded struts. A multiple cell construction with irregular architecture is possible. This can allow optimising the distribution of struts for stiffness, mass, shape accuracy and stability.

The flexibility of this modular architecture is illustrated in FIGS. 13A through 13D that illustrate schematically a folding sequence of a modular assembly 130, where a combination of rectangular and triangular modules builds up a deployable structure of a reflector, that can provide optimisation for stiffness and mass in the deployed configuration as well as optimised shape control of the portions of the reflecting mesh or membrane that require more surface accuracy.

Another example is illustrated in FIGS. 14A through 14D in which a folding sequence of a ring-type modular assembly 140 based on hexahedral unit cells 60 is illustrated. This embodiment results in a very mass-efficient and stiff construction as compared to prior art. The size of the modular assembly may be increased by adding more unit cells.

Figure 16A:
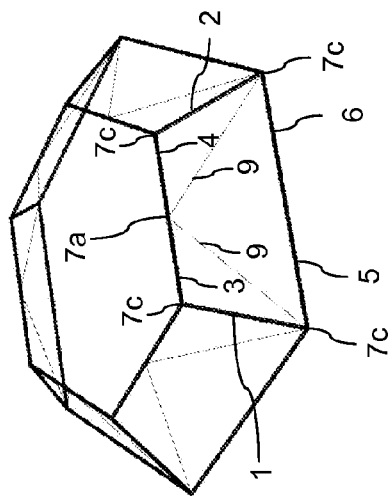
FIGS. 16A, 16B, 16C illustrate schematically a folding sequence of a hexagonal unit cell comprising a release control line according to an embodiment of the invention.
Figure 16B:
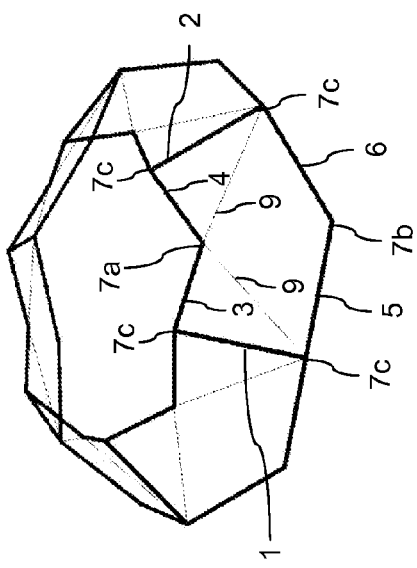
Figure 16C:
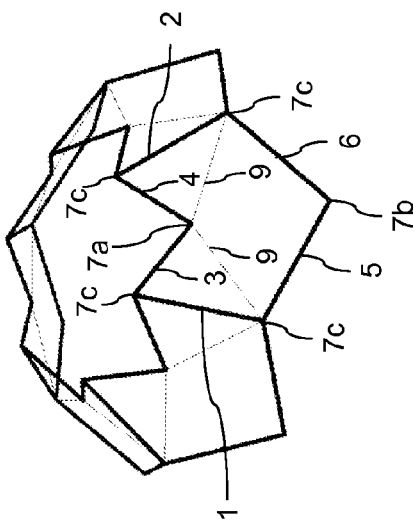
Figure 18A:
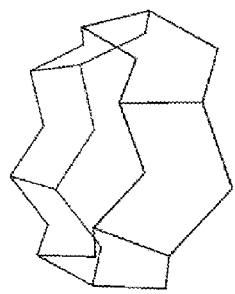
FIGS. 18A, 18B, 18C, 18D illustrate schematically a folding sequence of a hexagonal unit cell according to an embodiment of the invention.
Figure 18B:
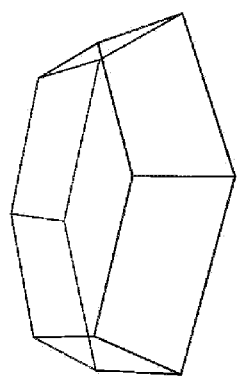
Figure 18C:
Figure 18D:
Figure 19A:
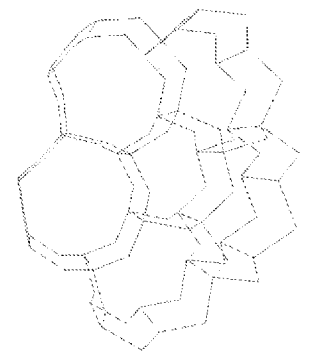
FIGS. 19A, 19B, 19C, 19D illustrate schematically a folding sequence of a modular assembly according to an embodiment of the invention.
Figure 19B:
Figure 19C:
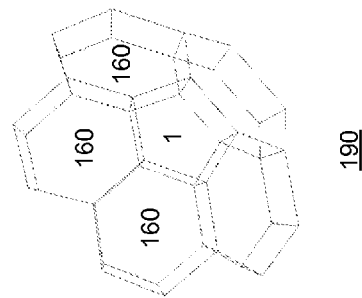
Figure 19D:
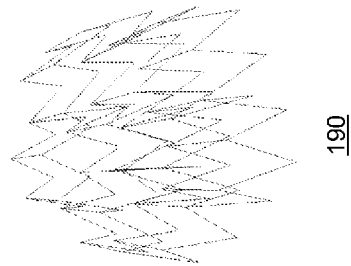

FIG. 15 illustrates schematically a release control line 9 of a unit cell according to an embodiment of the invention. The control of degrees of freedom for uniquely determined deployment and isostatic construction is described next. The actuation principle is based on a reliable distribution of rotational spring actuators or alternatively elastic hinges or electric motors. Spring actuators or elastic hinges are preferable for not requiring power lines on the structure. Again, to avoid unnecessarily complicating the drawings, only the triangular polyhedron truss of the unit cell and the release control lines 9 at the lateral facets 10 are shown but not constructional details such as the hinges 7 or the mechanism for elastically preloaded joints (cf. FIGS. 10A-10D for a more detail view of rotational spring actuators or alternatively elastic hinges or electric motors). Redundancy and reliability are increased through synchronisation. The elastic energy stored in the springs or hinges provides the deployment motorisation, as well as the control of the degrees of freedom of the system. The deployment speed is controlled with a cable 9 released with an electric actuator (not shown) for each or several cells. This can be seen in FIG. 15 for the particular case of the triangular pyramidal cell 150. The release control lines 9 are attached to the central hinges 7a of the top ring 52 and run through the diagonals of the facets 10. This release line can be a single cable unwound from a single actuator. The synchronisation of neighbouring corners, the cyclic boundary condition within the cell, the facet dihedral angles stops and the controlled length of the release cord are the means of guaranteeing the uniqueness of the deployment path. The ideal deployment path is the symmetric and homothetic transformation of the geometry, which is a state of minimum energy and hence stable in the quasi-static deployment case. Another embodiment of unit cell comprising a release control line 9 and the corresponding folding/deployment sequence is illustrated in FIGS. 16A through 16c. Similarly to the triangular pyramidal cell shown in FIG. 15, the hexagonal polyhedron truss 160 comprises release control lines 9 at the lateral facets that are attached to the central hinges 7a of the top ring and run through the diagonals of the facets. The elastic energy stored in the springs or hinges provides is then release by means of the control lines 9 to transform the hexagonal cell 160 from the folded into the deployed state.

In order to use the modular assembly based on the polyhedron trusses and the six-bar linkages as an antenna reflector for satellite communication networks, a continuous mesh can be assembled on the reflecting face, preferably balanced by a quasi-symmetrical architecture (not shown). This can eliminate concerns on periodicity of the reflecting surface (and hence grating lobes) by discontinuities of the backing structure, as well as potential passive intermodulation sources. As an alternative solution, a shell-membrane constructed with carbon fibre reinforced silicone may be used. This type of surface does not require pretension and allows therefore reducing the motorisation requirements, as well as controlling the surface errors due to tensioning, such as faceting and pillowing (curvature inversion in tensioned membranes). The antenna architecture of the present invention readily implements techniques to support a tensioned metal mesh, but is not limited to only these types of surfaces. The inventive structure, especially the non-folding configuration, can support any type of surface, whether solid or porous, tensioned or not. Using standard space qualified materials, the stability of the inventive structure will meet requirements for a precise reflector shape. The geometry and small mass of the architecture of the invention provide significant stiffness and minimal inertia to reduce dynamic distortions. Also, using low thermal coefficient of expansion materials ensures maintenance of the geometric precision when subjected to the extreme thermal environment of space. As a preferred option, the material of the struts should be Carbon fibre reinforced plastic or any other material of similar properties, in order to reduce thermal expansions and increase stiffness to mass ratio.

Another important aspect of the invention is the scalability property. This is understood as the possibility to change the dimensions of the six-bar linkage structure, as well as the unit cell constructed with six-bar linkages, within a certain range. This allows covering several dimensions of the deployed structure, by simply adapting the size of the unit cell accordingly. The benefit of this scaling capability is the reduction of development cost. The scaling method includes consideration of deployed stiffness and stability, overall mass and folded package dimensions.

The present invention finds also applications in civil engineering. The deployable structures can also be employed for on-ground constructions of buildings, temporary and permanent housing, roof frameworks of conventional houses, large domes and extensible bridges among others. The structure can be deployed in situ after assembly in a factory and transportation in folded state. The deployment principle also works under gravity provided that the structure is properly supported during deployment and the beams and their junctions have been correctly sized for the loads. The actuation by elastic hinges could be replaced by electric actuators, which would also provide reversibility if necessary. In the case of very large dimensions, the modular architecture is then the most suited one. An example is illustrated in FIG. 17 that shows schematically a construction 170 in deployed state based on triangular 11 and quadrilateral unit 10 cells according to an embodiment of the invention. The construction 170 could be either the dome of a large circular building or a foldable tent, depending on the cross sections and dimensions of the beams. The kinematics of the deployment are as described for the space reflector, with the difference of needing a central pole during the deployment that can be removed when deployed and the deployed structure supported at the edges. The resulting double layers of bars or beams, provide stiffness and strength to the construction, as well as room for isolation in between the exterior roof and the interior concentric ceiling.

The case of an hexagonal truncated pyramid unit cell (cf. FIGS. 7A and 7B) has been modelled within CAD and a Finite Element non-linear simulation model, including actuation at relevant hinges and resistive torque, in order to verify analytically the folding and deployment kinematics as well as the actuation with a cable release. This has been performed for the unit hexagonal cell 160, the results of which are shown in FIGS. 18A through 18D, as well as for the multiple cell construction involving hexagons and pentagons 190, the results of which are shown in FIG. 19A through 19D. The results are that the six-bar linkage facets can fold and unfold maintaining compatibility with the neighbouring facets and the structure can deploy in a uniquely controlled way.

Features, components and specific details of the structure of the above-described embodiments may be exchanged or combined to form further embodiments optimized for the respective application. As far as those modifications are already apparent for an expert skilled in the art, this shall be disclosed implicitly by the above description without specifying explicitly every possible combination, for the sake of conciseness of the present description.

The invention claimed is:

1. A polyhedron truss constructed with a six-bar linkage structure forming each lateral facet of the polyhedron truss, the six-bar linkage structure comprising:
   six articulated struts, wherein each strut is coupled to two other struts by a revolute joint to form a closed loop;
   the six-bar linkage structure being convertible from a deployed state into a folded state and vice versa;
   in the deployed state, the six-bar linkage structure forming a trapezoid with two opposing first and second parallel sides, each of the first and second opposing parallel sides being formed by two struts arranged in series and coupled by a first and a second of the revolute joints, respectively, at the center of the first and second parallel sides;
   in the folded state, the two struts of the first side being pivoted around the first revolute joint so that the opposing end portions of the two struts are located side by side, and the two struts of the second side being pivoted around the second revolute joint so that the opposing end portions of the two struts are located side by side;
   the polyhedron truss being convertible from the deployed state into the folded state and vice versa by converting the six-bar linkage structures of the lateral facets from the deployed state into the folded state and vice versa; and
   in the deployed state, the polyhedron truss having a polygonal truncated pyramidal shape comprising an upper ring and a lower ring of articulated struts.

2. The polyhedron truss according to claim 1, wherein the first revolute joint and the second revolute joint move away from each other when the six-bar linkage structure is being converted from the deployed state into the folded state.

3. The polyhedron truss according to claim 1, wherein the first and the second revolute joints initially move towards each other when the six-bar linkage structure is being converted from the deployed state into the folded state.

4. A six-bar linkage structure, comprising:
   six articulated struts, wherein each strut is coupled to two other struts by a revolute joint to form a closed loop;
   the six-bar linkage structure being convertible from a deployed state into a folded state and vice versa;
   in the deployed state, the six-bar linkage structure forming a quadrilateral with all opposing sides being non-parallel, with first and second opposing sides each being formed by two struts of different length arranged in series and joined by the revolute joint; and
   in the folded state, the two struts of the first and second sides being pivoted around their revolute joint.

5. A polyhedron truss constructed with a six-bar linkage structure according to claim 4 forming each lateral facet of the polyhedron truss;

the polyhedron truss being convertible from a deployed state into a folded state and vice versa by converting the six-bar linkage structures of the lateral facets from the deployed state into the folded state and vice versa; and in the deployed state, the polyhedron truss having a polygonal truncated pyramidal shape comprising an upper ring and a lower ring of articulated struts.

6. The polyhedron truss according to claim 5, wherein the struts of the non-parallel sides of the six-bar linkage structures converge towards a folding point when converting the polyhedron truss from a deployed state into a folded state.

7. The polyhedron truss according to claim 5, with at least some of the revolute joints being elastically preloaded to provide a deploying force to said struts forming the upper ring and the lower ring when converting from the folded state into the deployed state.

8. The polyhedron truss according to claim 5, further comprising a synchronization device at at least one corner coupling two adjacent lateral facets.

9. The polyhedron truss according to claim 5, wherein the struts forming the upper ring and the lower ring are hinged in a facet plane and pivot-mounted with respect to the non-parallel struts so that a dihedral angle is reduced when converting the polyhedron truss from the deployed state into the folded state.

10. The polyhedron truss according to claim 5, the polyhedron truss having a truncated pyramid shape in the deployed state.

11. The polyhedron truss according to claim 10, in the deployed state, the polyhedron truss having a truncated hexagonal pyramid shape, a truncated triangular pyramid shape, a truncated quadrilateral pyramid shape, or a truncated pentagonal pyramid shape.

12. The polyhedron truss according to claim 7, wherein a deployment speed of the revolute joints that are elastically preloaded is regulated with an electric actuator connected with a control line attached to the elastically preloaded revolute joints of the upper ring and the lower ring.

13. A modular assembly comprising multiple polyhedron trusses according to claim 5, wherein neighboring polyhedron trusses share a lateral facet.

14. The modular assembly according to claim 13, the polyhedron trusses being of the same type.

15. The modular assembly according to claim 13, wherein polyhedron trusses of different types are combined.

16. A deployable reflector or antenna structure comprising a modular assembly according to claim 13, further comprising a continuous mesh of a quasi-symmetrical architecture or a shell-membrane mounted as a reflecting surface on upper facets of the polyhedron trusses.

17. A deployable reflector or antenna structure comprising a scaled assembly of polyhedron trusses according to claim 5, further comprising a continuous mesh of a quasi-symmetrical architecture or a shell-membrane mounted as a reflecting surface on upper facets of the polyhedron trusses, covering a range of dimensions with similar mechanical characteristics.

18. The modular assembly according to claim 13, combining polyhedron trusses of polygonal truncated hexahedral pyramid shapes to form a ring structure.

19. The polyhedron truss according to claim 1, wherein the struts of the non-parallel sides of the six-bar linkage structures converge towards a folding point when converting the polyhedron truss from a deployed state into a folded state.

20. The polyhedron truss according to claim 1, with at least some of the revolute joints being elastically preloaded to provide a deploying force to said struts forming the upper ring and the lower ring when converting from the folded state into the deployed state.

21. The polyhedron truss according to claim 1, further comprising a synchronization device at at least one corner coupling two adjacent lateral facets.

22. The polyhedron truss according to claim 1, wherein the struts forming the upper ring and the lower ring are hinged in a facet plane and pivot-mounted with respect to the non-parallel struts so that a dihedral angle is reduced when converting the polyhedron truss from the deployed state into the folded state.

23. The polyhedron truss according to claim 1, the polyhedron truss having a truncated pyramid shape in the deployed state.

24. The polyhedron truss according to claim 23, in the deployed state, the polyhedron truss having a truncated hexagonal pyramid shape, a truncated triangular pyramid shape, a truncated quadrilateral pyramid shape, or a truncated pentagonal pyramid shape.

25. The polyhedron truss according to claim 20, wherein a deployment speed of the revolute joints that are elastically preloaded is regulated with an electric actuator connected with a control line attached to the elastically preloaded revolute joints of the upper ring and the lower ring.

26. A modular assembly comprising multiple polyhedron trusses according to claim 1, wherein neighboring polyhedron trusses share a lateral facet.

27. The modular assembly according to claim 26, the polyhedron trusses being of the same type.

28. The modular assembly according to claim 26, wherein polyhedron trusses of different types are combined.

29. A deployable reflector or antenna structure comprising a modular assembly according to claim 26, further comprising a continuous mesh of a quasi-symmetrical architecture or a shell-membrane mounted as a reflecting surface on upper facets of the polyhedron trusses.

30. A deployable reflector or antenna structure comprising a scaled assembly of polyhedron trusses according to claim 1, further comprising a continuous mesh of a quasi-symmetrical architecture or a shell-membrane mounted as a reflecting surface on upper facets of the polyhedron trusses, covering a range of dimensions with similar mechanical characteristics.

31. The modular assembly according to claim 26, combining polyhedron trusses of polygonal truncated hexahedral pyramid shapes to form a ring structure.

* * * * *